United States Patent [19]

Helgorsky et al.

[11] 4,372,923

[45] Feb. 8, 1983

[54] PURIFICATION OF SOLUTIONS OF GALLIUM VALUES BY LIQUID/LIQUID EXTRACTION

[75] Inventors: Jacques Helgorsky, Frepillon; Alain Leveque, Paris, both of France

[73] Assignee: Rhone-Poulenc Industries, Paris, France

[21] Appl. No.: 326,178

[22] Filed: Nov. 30, 1981

[30] Foreign Application Priority Data

Dec. 5, 1980 [FR] France ............................... 80 25831

[51] Int. Cl.$^3$ ............................................. C01G 15/00
[52] U.S. Cl. ................................ 423/112; 75/101 BE; 423/139
[58] Field of Search .......................... 423/112, 101 BE

[56] References Cited

U.S. PATENT DOCUMENTS

| | | | |
|---|---|---|---|
| 3,971,843 | 7/1976 | Helgorsky et al. | 423/112 |
| 4,169,130 | 1/1979 | Helgorsky et al. | 423/112 |
| 4,193,968 | 3/1980 | Sullivan et al. | 423/112 |
| 4,241,029 | 12/1980 | Helgorsky et al. | 423/112 |

OTHER PUBLICATIONS

Bagreeu et al., "Journal of Inorg. & Nuclear Chem.," vol. 40, 1978, pp. 553-557.
Vonarovskaya et al., "Chemical Abstr.," vol. 87, 1977, #170934w.
Gilbert et al., "Chemical Absts.," vol. 69, 1968, #15612z.

Primary Examiner—Herbert T. Carter
Attorney, Agent, or Firm—Burns, Doane, Swecker & Mathis

[57] ABSTRACT

Highly pure (>99.99%) aqueous solutions of gallium chloride are obtained by (i) liquid/liquid extracting an aqueous hydrochloric acid solution of gallium values with an organic phase which comprises a quaternary ammonium chloride extractant, (ii) separating the organic phase from the aqueous phase, (iii) selectively washing said organic phase by intimately contacting same with an aqueous solution of hydrochloric acid to remove any remaining impurities, whereby purified gallium values are transferred from said organic phase into an aqueous solution thereof, and (iv) then separating said organic phase from said resulting aqueous phase, whereby said aqueous phase comprises pure gallium chloride.

13 Claims, 1 Drawing Figure

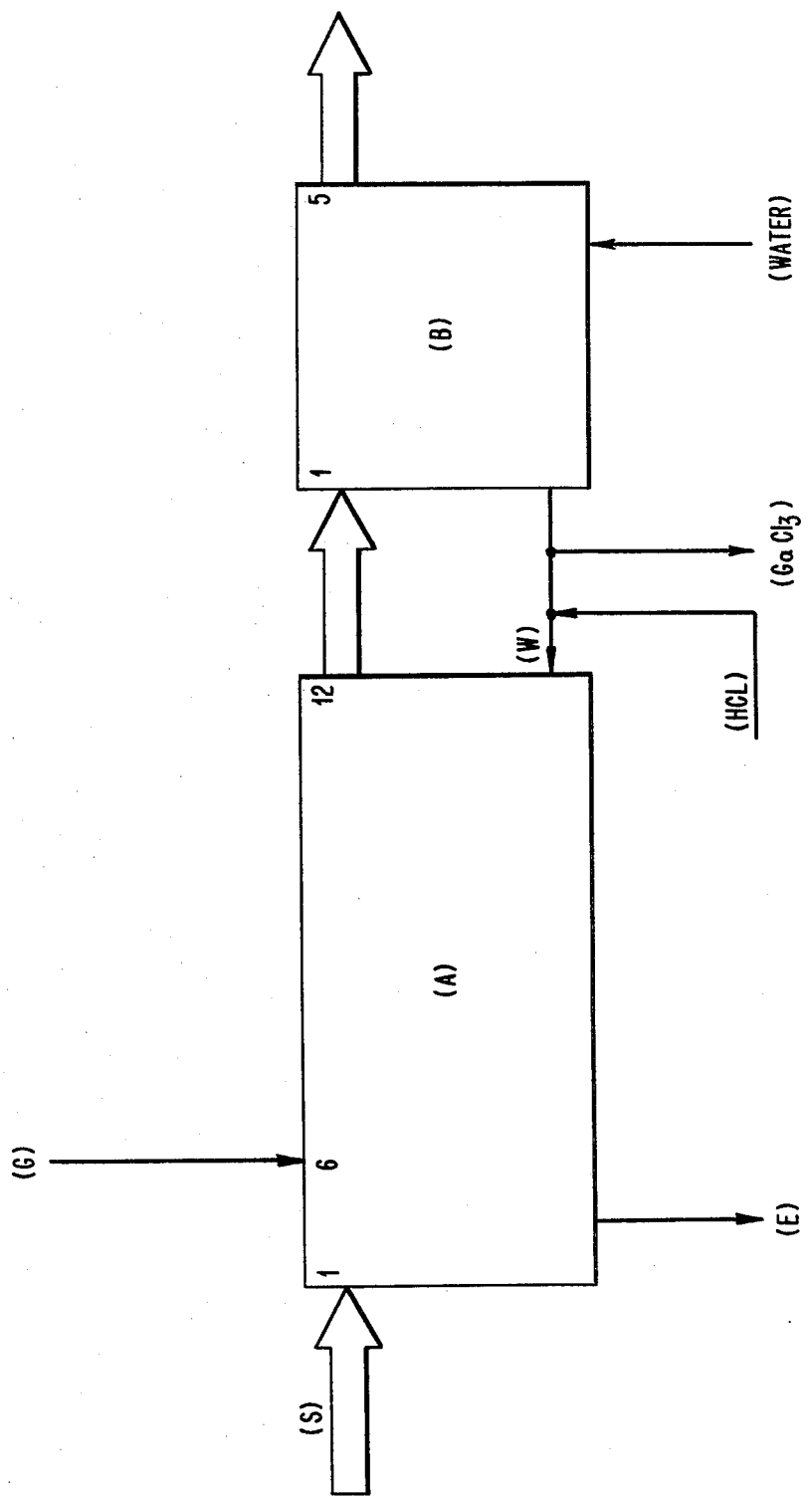

PURIFICATION OF SOLUTIONS OF GALLIUM VALUES BY LIQUID/LIQUID EXTRACTION

CROSS-REFERENCE TO RELATED APPLICATIONS

Leveque et al copending applications, Ser. No. 326,177 and Ser. No. 326,166, both field concurrently herewith, both assigned to the assignee hereof, and both hereby expressly incorporated by reference. Cf. Helgorsky et al U.S. Pat. Nos. 3,971,843, 4,169,130 and 4,241,029.

BACKGROUND OF THE INVENTION

1. Field of the Invention

The present invention relates to the purification of solutions of gallium, and, more especially, to such purification as to obtain a solution of gallium chloride very high in purity.

The invention more particularly relates to a process for the purification of aqueous hydrochloric acid solutions of gallium in the presence of various elements, notably of iron in ferric state, by liquid/liquid extraction utilizing a quaternary ammonium salt extractant.

2. Description of the Prior Art

The various applications to which gallium is put, in particular in the field of electronics, make it necessary to obtain the gallium in a very high degree of purity. Although the separation of gallium from various metal cations using tertiary amines has heretofore been achieved, the separation of gallium from various elements, and in particular from iron in ferric state, has hitherto proved unattainable without prior reduction of the iron to the ferrous state [*Chemical Abstracts*, 92, 9435c (1979)].

SUMMARY OF THE INVENTION

Overcoming the technical presumption that it is impossible, in particular, to separate gallium from iron in the ferric state by solvent extraction, there is hereby provided as a major object of the present invention a novel process for the purification of solutions of gallium, which process features markedly enhanced and excellent purification of the aforesaid solutions in the presence of various elements, and in particular of iron in the ferric state. The subject process effects the selective extraction of gallium from a solution containing the various elements, and in particular iron in the ferric state, using quaternary ammonium salts as the organic extractant.

BRIEF DESCRIPTION OF THE DRAWINGS

The FIGURE of Drawing is a schematic/diagrammatic illustration of extraction apparatus suitable for carrying out the process according to this invention.

DETAILED DESCRIPTION OF THE INVENTION

More particularly according to this invention, the subject process features the purification of an aqueous hydrochloric acid solution of gallium by liquid/liquid extraction utilizing an organic extractant, and wherein (i) the aqueous hydrochloric acid solution of gallium is contacted with an organic phase containing, as the extractant, a quaternary ammonium chloride, (ii) the organic phase is next separated from the gaseous phase, with the gallium being selectively extracted into the organic phase, (iii) the organic phase is then contacted with a wash solution in order to effect a selective washing of this organic phase, thus removing any remaining impurities, (iv) the purified gallium is then transferred from the organic phase into an aqueous solution and, finally, (v) the organic phase is separated from the resulting aqueous phase, with the aqueous phase containing the pure gallium chloride.

In accordance with the process of the invention, the aqueous hydrochloric acid solution of gallium is contacted with an organic phase containing a quaternary ammonium chloride gallium extractant dissolved in suitable inert diluent, such that the gallium is selectively extracted into the organic phase.

The aqueous hydrochloric acid solutions of gallium which can be purified consistent with this invention, for the purpose of obtaining solutions very high in purity, can emanate from very diverse origins. Same are characterized by a free HCl acidity of from about 1 to about 8 N, and preferably from 2 to 6 N. Same can also contain mixtures of hydrochloric acid and other acids, such as sulfuric acid or perchloric acid.

The nature and amount of the impurities contained in these solutions can be very varied and the impurities can consist of various metal cations from the Periodic Table of elements, notably those of calcium, magnesium, aluminum, vanadium, chromium, copper, manganese, sodium, zinc, cobalt, nickel, lead, cadmium, indium, barium, strontium, potassium, titanium, lanthanides, yttrium, arsenic, iron (particularly in the ferric state), phosphorus, tin, boron, and the like.

Furthermore, the concentration of gallium in these solutions can also vary over very wide limits, for example, from about 500 mg/liter to about 300 g/liter, this example being given purely by way of illustration.

The ammonium salts which can be used in accordance with the process of the invention are those having the formula $R_4N^+Cl^-$ in which the hydrocarbon radical R contains 1 to 16 carbon atoms and is an alkyl, alkenyl linear or branched chain.

The ammonium salts which can be used in accordance with the process of the invention are preferably those having the formula $R_3N\text{-}CH_3^+Cl^-$ in which the hydrocarbon radical R advantageously has from 8 to 10 carbon atoms. Such salts are marketed, for example, under the trademarks Adogen 464 and Aliquat 336.

The proportion or amount of the quaternary ammonium salt extractant comprising the organic phase is not critical and also can vary over wide limits. Advantageously, such amount is as high as possible, and, preferably, an amount which ranges from about 3% to about 30% by volume, relative to the organic phase, provides hydrodynamic conditions well suited for the purification according to this invention.

If appropriate, the organic phase can contain a diluent which can be selected, in particular, and as is well known to those skilled in this art, from among the aliphatic compounds such as heptane, dodecane and hexane; petroleum cuts of the kerosene type; aromatic compounds such as, for example, benzene, toluene, ethylbenzene, xylene and cuts of the Solvesso type (registered trademark of Exxon), and, finally, halogen derivatives of these compounds, such as, for example, chloroform and carbon tetrachloride.

The organic phase is separated from the aqueous phase, with the gallium being selectively extracted into the organic phase; the organic phase is then brought into contact with a hydrochloric acid solution in order to carry out a selective washing operation on this organic phase by removing the remaining impurities.

The wash solution has an acidity ranging from about 5 to about 8 M and contains from about 1 to about 50 g/liter of gallium, preferably from about 3 to about 10 g/liter of gallium. Exemplary wash solution is, for example, a mixture of, on the one hand, an aqueous hydrochloric acid solution advantageously at a concentration ranging from about 7 to about 12 M, and, on the other, a fraction of the ultimately resulting purified aqueous solution of gallium chloride.

The aqueous washing solution which results, which contains the impurities and a small amount of gallium, can optionally be recycled with the initial aqueous hydrochloric acid solution of gallium in order to repeat the purification operation.

The purified gallium is then transferred from the organic phase into an aqueous solution by bringing the organic phase into contact with water, and, finally, the organic phase is separated from the resulting aqueous phase, with said aqueous phase containing pure gallium chloride.

The purity of the aqueous solution of gallium thus obtained is in excess of 99.99%.

The steps of extraction, selective washing and recovery of the gallium can be carried out in conventional apparatus used for liquid/liquid extractions.

Such apparatus typically comprises several stages of mixer/decanter systems or of packed and/ior agitated columns, arranged such as to carry out the operations of extraction, selective washing and recovery of the extracted element into the aqueous phase.

In order to further illustrate the present invention and the advantages thereof, the following specific example is given, it being understood that same is intended only as illustrative and in nowise limitative.

EXAMPLE

A solution (G) of gallium chloride, having the following composition:

| Ga: | 53 g/liter |
| --- | --- |
| HCl: | 6 N |
| Al: | 3 mg/liter |
| Na: | 25 mg/liter |
| $Fe^{3+}$: | 650 mg/liter |
| Ca: | 1.5 mg/liter |
| Mg: | 1 mg/liter |
| Cr: | 0.6 mg/liter |
| V: | 0.2 mg/liter |
| Cu: | 0.4 mg/liter |
| Mn: | 0.4 mg/liter |
| Zn: | 1.6 mg/liter |
| Pb: | 0.1 mg/liter | was purified.

The foregoing solution (G) was intimately contacted with an organic phase (S) consisting of a 6% strength solution of tricaprylylmethylammonium chloride (sold under the trademark Aliquat 336 in the chloride form) in Solvesso 150 (registered trademark of Exxon).

Such contacting was carried out, as illustrated in the accompanying FIGURE of Drawing, in a multi-stage liquid/liquid extraction apparatus (A) operating countercurrently and comprising 12 theoretical stages. The organic phase (S) was charged into the apparatus at stage 1 at a flow rate of 2,540 ml/hour. The solution of gallium (G) was introduced into the apparatus at stage 6 at a flow rate of 300 ml/hour. The selective washing of the charged organic phase was carried out in stages 6 to 12 by means of the wash solution (W) described below.

The organic phase exiting A, which contained the purified gallium, was then charged into stage 1 of the apparatus B comprising 5 theoretical stages, in which apparatus the gallium was re-extracted, with water entering at stage 5 at a flow rate of 1,270 ml/hour, in the form of an aqueous solution of gallium chloride containing 14 g/liter of Ga.

635 ml/hour of this solution were removed and same constituted the final production, while 635 ml/hour were combined with 635 ml/hour of 12 M HCl to form the wash solution W which was then fed into the apparatus A at stage 12.

The exhausted solution E contained the impurities and less than 50 mg/liter of Ga, namely, more than 99% of the gallium had been extracted.

The solution of purified gallium had the following composition:

| Ga: | 14 g/liter |
| --- | --- |
| Al | <0.2 mg/liter |
| Na | <0.05 mg/liter |
| Fe | <0.1 mg/liter |
| Ca | <0.05 mg/liter |
| Mg | <0.05 mg/liter |
| Cr | <0.1 mg/liter |
| V | <0.05 mg/liter |
| Cu | <0.1 mg/liter |
| Mn | <0.05 mg/liter |
| Zn | <0.05 mg/liter |
| Pb | <0.05 mg/liter | which corresponded, for the gallium, to a purity in excess of 99.99%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the purification of an aqueous hydrochloric acid solution of gallium values by liquid/liquid extraction, comprising (i) liquid/liquid extracting an aqueous hydrochloric acid solution of gallium values with an organic phase which comprises a quaternary ammonium chloride extractant, (ii) separating the organic phase from the aqueous phase, (iii) selectively washing said organic phase by intimately contacting same with an aqueous solution of hydrochloric acid, whereby any remaining impurities are removed, (iv) next transferring the purified gallium values from said organic phase into an aqueous solution thereof, and (v) thence separating said organic phase from said resulting aqueous phase, whereby said aqueous phase comprises pure gallium chloride.

2. The process as defined by claim 1, said starting aqueous hydrochloric acid solution of gallium values having a free HCl acidity ranging from about 1 to about 8 N.

3. The process as defined by claim 2, said starting solution having a free HCl acidity ranging from 2 to 6 N.

4. The process as defined by claim 2, said starting solution further comprising sulfuric acid or perchloric acid.

5. The process as defined by claim 1, said starting aqueous hydrochloric acid solution of gallium values comprising at least one of the metal cations of calcium, magnesium, aluminum, vanadium, chromium, copper, manganese, sodium, zinc, cobalt, nickel, lead, cadmium, indium, barium, strontium, potassium, titanium, lanthanides, yttrium, arsenic, iron, phosphorus, tin and boron.

6. The process as defined by claim 5, the concentration of gallium in said starting solution ranging from about 500 mg/liter to about 300 g/liter.

7. The process as defined by claim 5, said starting solution comprising ferric iron.

8. The process as defined by claim 1, said organic phase comprising a diluent selected from the group consisting of heptane, dodecane, hexane, petroleum cut of kerosene type, benzene, toluene, ethylbenzene, xylene, cut of Solvesso type, chloroform and carbon tetrachloride.

9. The process as defined by claim 1, said quaternary ammonium chloride extractant having the formula:

$$R_3NCH_3^+Cl^-$$

wherein each R is a hydrocarbon having from 8 to 10 carbon atoms.

10. The process as defined in claims 1 or 9, the amount of extractant comprising said step (i) organic phase ranging from about 3% to about 30% by volume, based upon said organic phase.

11. The process as defined by claim 1, said organic phase being (iii) selectively washed with an about 5 M to about 8 M solution of hydrochloric acid containing from about 1 to about 50 g/liter of gallium.

12. The process as defined by claim 11, said solution of hydrochloric acid containing from 3 to 10 g/liter of gallium.

13. The process as defined by claim 11, said selective wash solution comprising a mixture of (1) an about 7 M to about 12 M solution of hydrochloric acid, and (2) a fraction of the ultimately resulting aqueous phase which comprises the pure gallium chloride.

* * * * *